Patented June 9, 1942

2,285,409

UNITED STATES PATENT OFFICE

2,285,409

PEST CONTROL

Euclid W. Bousquet and Ellsworth K. Ellingboe, Wilmington, and Hubert G. Guy, Newark, Del., assignors to E. I. du Pont de Nemours & Company, Wilmington, Del., a corporation of Delaware No Drawing. Application February 26, 1941, Serial No. 380,616

12 Claims. (Cl. 167—33)

This invention relates to pest control and is particularly directed to methods and compositions for preventing or arresting infestations of insects and other pestiferous organisms, such as fungi, bacteria, protozoa, and molds, which are economically harmful to man and which commonly infest organic matter whether plant or animal, or of plant or animal origin, either in the natural, fabricated or synthetic state; which compositions distinguish from the processes and compositions known heretofore in the use of 1,2,4-dithiazoles as the active agent of the processes and compositions.

The 1,2,4-dithiazoles are nitrogen-sulfur heterocyclic compounds containing a 5-membered ring having two adjacent sulfur atoms each attached to carbon, with nitrogen as the fifth member of the ring. This ring system is illustrated by the following skeleton formula

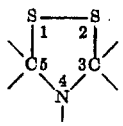

and the term dithiazole is used for present purposes irrespective of the saturation of the nucleus, that is to say, formulation with single bonds joining the nitrogen atom to each of the carbons or a double bond joining the nitrogen with one of the carbons. As a matter of fact, many of these compounds may be represented in both forms since there is evidence that they can exist in tautomeric forms.

The extranuclear valences of the carbon atoms of the ring may be satisfied by hydrogen or by organic radicals such as alkyl, cycloalkyl, aralkyl and aryl which in turn may carry substituents such as halogen, alkoxy and alkylamino groups. Also, the ring carbons may be attached to elements from the group consisting of oxygen, sulfur and nitrogen which may completely satisfy the valences of the ring carbons by formation of a double bond therewith or may form a connecting link between the 1,2,4-dithiazole ring and an organic radical such as an alkyl or aryl radical. The 1,2,4-dithiazoles in which both ring carbons are attached to one of the elements sulfur and nitrogen, are a preferred form of the invention.

The ring nitrogen atom has two valences satisfied by attachment to the adjacent carbon atoms of the 1,2,4-dithiazole ring. The third valence of the nitrogen is satisfied in one of three ways— (1) formation of a double bond with an adjacent carbon atom, (2) by hydrogen, or (3) by an alkyl or aryl group.

Many of the new pest control agents may be written in two tautomeric forms, depending on the position of a hydrogen atom, thus

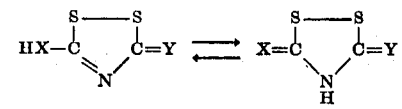

In these formulas X may be oxygen, bivalent sulfur, or an imino group —NR—, R being hydrogen or an organic radical. Y may be selected from these same groups or may be a substituent group as described in the preceding paragraph. Ordinarily imino and amino groups will impart basic properties to the compounds so that salts may be formed by reaction with suitable acids.

In general the products of this invention are insoluble in water, alcohol and ether. For example, xanthane hydride (3-imino-5-thioketo-1,2,4-dithiazoline), which may be represented as follows,

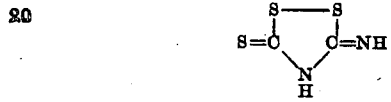

is a high-melting yellow crystalline solid usually crystallized from 60% acetic acid. It may be solubilized in most alkalies and under the influence of such reagents may be converted to dithiocyanic and perthiocyanic acid salts. With aromatic amines the corresponding dithiobiurets are obtained. Also, phenylthiuret (3-imino-5-phenylimino-1,2,4-dithiazoline), which may be represented as follows,

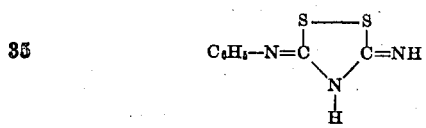

is characterized by solubility in dilute mineral acids. It is obtained from phenyldithiobiuret which in turn may be obtained from xanthane hydride by the action of aniline.

The products of this invention may be prepared by well known synthetic methods from relatively cheap raw materials and thus are particularly attractive as competitive pest control agents. Xanthane hydride, for example, is easily prepared by reaction of various mineral acids on ammonium thiocyanate at ordinary room temperature. Other thiocyanates such as sodium or potassium thiocyanate may be used in this reaction. The xanthane hydride, as noted above, may be easily converted into a number of other products including dithiobiurets which on oxidation with oxidizing agents such as iodine, hydrogen peroxide or ferric chloride results in the formation of the corresponding thiuret.

The pest control agents of this invention may be prepared in suitable compositions according to their intended use as an insecticide, insectifuge, foliage protectant, protectant for textile fabrics, as a toxic ingredient in poison bait or otherwise. Suitable compositions are illustrated in the following examples:

Example 1

Zanthane hydride prepared by allowing a mixture of 445 parts of ammonium thiocyanate, 540 parts of concentrated hydrochloric and 295 parts of water to stand at room temperature for two days is milled with Bancroft clay, lauryl alcohol and a sulfonated naphthalene-formaldehyde condensation product in proportions to give a product containing 80% xanthane hydride, 18.8% Bancroft clay, 0.5% lauryl alcohol and 0.07% of the sulfonated condensation product.

This product disperses readily in water and may be applied from usual spray equipment. Applied to bean foliage infested with Mexican bean beetle (adult) it gave the same degree of protection to foliage as lead arsenate and killed 40 per cent of the beetles as compared with 70 per cent for lead arsenate under conditions in which untreated plants were completely defoliated.

In place of xanthane hydride in the above composition there may be substituted phenylthiuret and its salts such as the hydrochloride, hydrobromide, borate, salicylate, p-hydroxyphenyl sulfonate, etc.

Example 2

Phenylthiuret hydroiodide formed by allowing a mixture of 42 parts of phenyldithiobiuret suspended to 230 parts of ethyl alcohol to be added slowly to a solution of 50 parts of iodine in 150 parts of ethyl alcohol and allowed to stand at room temperature for 15 hours is milled with Bancroft clay in amount to yield a product containing 80% of the active agent. This product wets out well in water and is suitable for forming spray suspensions. Applied in concentration of 1 part active ingredient in 200 to bean foliage infested with Mexican bean beetle adults it is more effective than calcium arsenate applied in the same manner.

In place of the hydroiodide other salts, as noted above, may be employed in this composition. Also, xanthane hydride and phenylthiuret may be used in place of the phenylthiuret hydroiodide, though these latter products may not wet out quite so readily.

The spray products of Examples 1 and 2 are suitable for application to foliage infested with other pests such as Japanese beetles, Colorado potato beetles and the like. The same compositions may be diluted with talc and applied as dusts, or the active principles may be milled with talc alone to provide suitable dusting compositions. Such compositions containing 0.5 to 5% active agent will be suitable for most such applications.

While we have disclosed suitably representative compositions it is to be understood that the invention is in no wise limited thereto but that the active agents may be applied in many ways, as, for example, from solutions or aqueous sprays and dispersions, from dusts such as talc or bentonite dusts, from organic solvents such as trichloro- and tetrachloroethylene, hydrocarbon solvents and vegetable and mineral oils. The various applications may include adhesives or sticking agents, spreaders or wetting agents, and other common adjuvants. They may be applied in admixture with other active agents such as metallic arsenates, fluosilicates, phenothiazines, organic thiocyanates, nicotine, rotenone, hellebore, pyrethrum, isobutylundecylenamide and like insecticidally active agent, or with materials such as Bordeaux mixture, Burgundy mixture, chelate coppers of saliccylaldehyde or acyl acetonates, chlorinated phenols, aminomethyl sulfides and like fungicidally active agents.

We claim:

1. A pest control composition containing as an essential active ingredient a 1,2,4-dithiazole.

2. A pest control composition containing as an essential active ingredient a 1,2,4-dithiazole in which the nitrogen valence is satisfied by hydrogen and the extranuclear valences of at least one carbon are satisfied by a divalent radical selected from the class consisting of oxygen, sulfur, and imino radicals.

3. An insecticidal composition containing as an essential active ingredient a compound having the formula

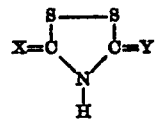

in which X and Y are the same or different groups selected from the class consisting of sulfur, oxygen, and imino radicals.

4. A pest control composition useful as an insecticide containing as an essential active ingredient a compound selected from the class consisting of xanthane hydride and aryl thiurets.

5. An insecticidal composition containing as an essential active ingredient phenyl thiouret.

6. An insecticidal composition containing as an essential active ingredient xanthane hydride.

7. The method of protecting organic matter from the attack of insect pests which comprises applying to said matter a 1,2,4-dithiazole.

8. The method of protecting organic matter from the attack of insect pests which comprises applying to said matter a 1,2,4-dithiazole in which the nitrogen valence is satisfied by hydrogen and the extra-nuclear valences of at least one carbon are satisfied by a divalent radical selected from the class consisting of oxygen, sulfur, and imino radicals.

9. The method of protecting organic matter from the attack of insect pests which comprises applying to said matter a compound having the formula

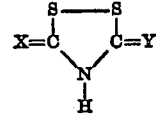

in which X and Y are the same or different groups selected from the class consisting of sulfur, oxygen, and imino radicals.

10. The method of protecting organic matter from the attack of insect pests which comprises applying to said matter a compound selected from the class consisting of xanthane hydride and aryl thiourets.

11. The method of protecting organic matter from the attack of insect pests which comprises applying to said matter phenyl thiouret.

12. The method of protecting organic matter from the attack of insect pests which comprises applying to said matter xanthane hydride.

EUCLID W. BOUSQUET.
ELLSWORTH K. ELLINGBOE.
HUBERT G. GUY.